(No Model.) 2 Sheets—Sheet 1.

A. S. McDERMOTT.
DEVICE FOR ATTACHING SHOVEL STANDARDS, &c.

No. 501,955. Patented July 25, 1893.

Witnesses:
H. B. Kingsbery.
C. L. Northup.

Inventor:
Augustus S. McDermott,
by his attorney
Wm. E. Poulter.

(No Model.)  2 Sheets—Sheet 2.
A. S. McDERMOTT.
DEVICE FOR ATTACHING SHOVEL STANDARDS, &c.
No. 501,955. Patented July 25, 1893.
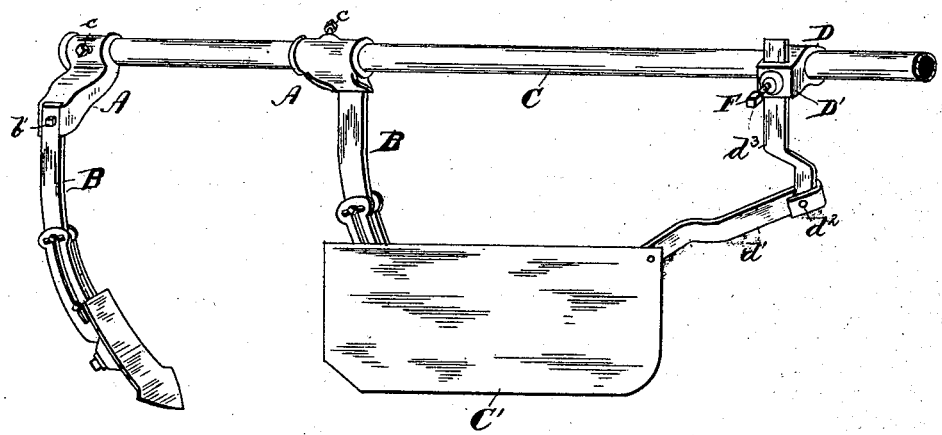
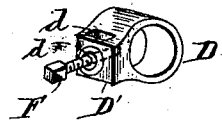

UNITED STATES PATENT OFFICE.

AUGUSTUS S. McDERMOTT, OF DUBUQUE, IOWA.

DEVICE FOR ATTACHING SHOVEL-STANDARDS, &c.

SPECIFICATION forming part of Letters Patent No. 501,955, dated July 25, 1893.

Application filed August 30, 1892. Serial No. 444,525. (No model.)

*To all whom it may concern:*

Be it known that I, AUGUSTUS S. McDERMOTT, a citizen of the United States, residing at Dubuque, in the county of Dubuque and State of Iowa, have invented certain new and useful Improvements in Devices for Attaching Shovel-Standards and Shields to Cultivator Drag-Bars; and I do hereby declare the following to be a full, clear, and exact description of the invention, such as will enable others skilled in the art to which it appertains to make and use the same.

My invention has relation to cultivators, and relates more particularly to a device for attaching shovel standards to drag-bars of cultivators, also to a device for attaching the ordinary fender-plate or shield for the young corn plants to said drag-bars, and among the objects in view is to provide simple and inexpensive devices for attaching shovel-standards and shields to and adapting them to be supported from the drag-bars, and to permit of easy and quick adjustment of said shovel standards and shields upon and relatively to said drag-bars.

The invention consists in the peculiar and novel construction of the devices and combination of the same with a drag-bar, all as hereinafter fully described, illustrated in the accompanying drawings and pointed out in the appended claims.

Figure 1:
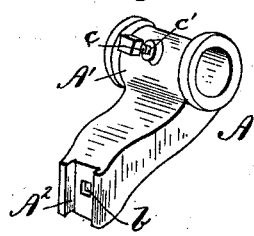
Figure 2:
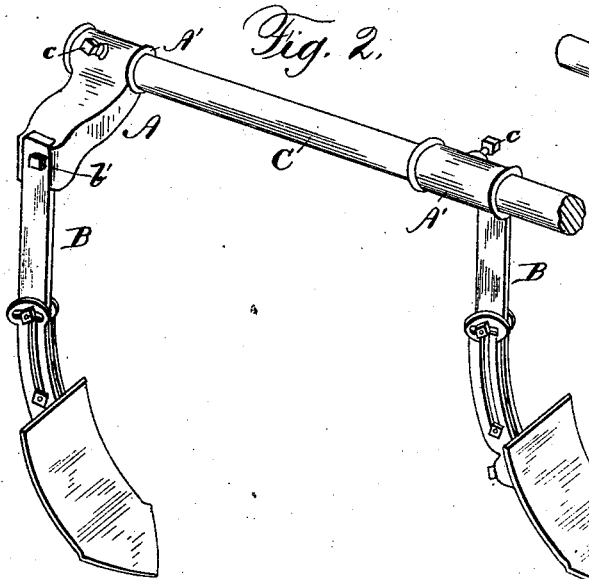
Figure 3:
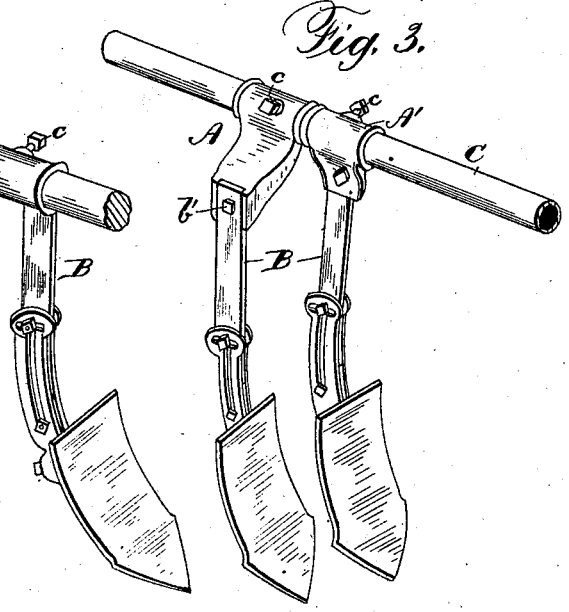
Figure 4:
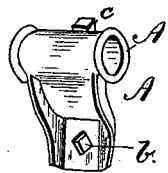
Figure 5:
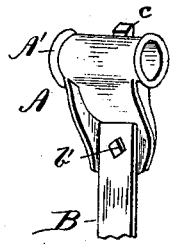

In said drawings:—Figure 1 is a detail perspective view of the improved device for attaching shovel-standards to drag-bars. Fig. 2 is a perspective view of a drag-bar showing two shovel-standards and shovels attached thereto by the improved attaching device. Fig. 3 is a like view showing the shovel standards and shovels adjusted in proximity to each other for hilling purposes. Fig. 4 is a rear view in perspective of one of the attaching devices. Fig. 5 is a detail perspective view showing a shovel-standard secured upon the rear side of the arm. Fig. 6 is a perspective view of a drag-bar and shovel and shovel-standards, showing a shield attached to said drag-bar by my improved attaching device. Fig. 7 is an enlarged detail perspective view of the shield attaching device.

My improved attaching devices or arms are adapted to be applied to drag-bars of various classes of cultivators, whether said drag-bars be of wood or metal and solid or tubular.

In order to permit of the circumferential adjustment about the drag-bar of the arm for attaching the shovel-standards, it is essential that the drag-bar should be annular at the point at which the arm is applied, and inasmuch as it is my object to permit of the longitudinal adjustment of the said arm along the drag-bar, or in the direction of the draft, I prefer to give the drag-bar an annular shape throughout its length.

My improved device for attaching the shovel-standards consists of a metallic arm A formed by a plate bent into substantially the shape shown. Although I prefer to employ metal in the construction of the arm, yet in some cases wood might be employed for that purpose. One end of the arm terminates in a sleeve A' having an annular bore, the diameter of which is such as to permit of the passage therethrough of a drag-bar C. The opposite end of the arm is provided with a rectangular groove or recess $A^2$ adapted to receive the upper end of a shovel-standard B. A perforation $b$, extends through the arm A at its outer end to receive a securing bolt $b'$, passing through the upper end of the standard, whereby the latter is rigidly secured to the arm. The arm A is adjustably secured to the drag-bar by means of a set-screw $c$, which works in a threaded opening $c'$ in the sleeve A' and bears at its inner end upon the drag-bar. This method of and means for adjustably securing the arm to the drag-bar are extremely simple and for that reason I prefer to employ the same.

The construction of the shovel-standard forms no part of the present invention, it being only necessary that the upper end of said standard should be adapted to pass and be secured within the recess $A^2$.

Although I show but two standards and shovels mounted upon the drag-bar, it is obvious that a greater or less number can be employed.

Owing to the construction of the arm and the method of mounting the same upon the drag-bar, it will be readily seen that either or all of the arms can be readily and quickly adjusted upon the drag-bar, either circumferentially or longitudinally thereof. When adjusted circumferentially, the shovels will be adjusted to throw dirt either inwardly toward or outwardly from the plants, the points of the shovels being in all adjustments held in line with the draft, thereby enabling the shovels to perform better work. By adjusting one of the shovel-standards to the right of the longitudinal vertical line of the drag-bar and the other shovel to the left of said line, rubbish is permitted to freely pass between the shovels when working in bad ground. For hilling purposes I adjust the shovels in proximity to each other as shown in Fig. 3, whereby a broad working surface or practically one shovel is formed, and to bring the shovels still nearer to each other, I remove either or both of the standards from the recesses in the arms and apply them to the rear sides of said arms, as in Fig. 5.

In Figs. 6 and 7 I have shown an improved device for attaching the ordinary shields C' to a drag-bar, and said attaching device consists of a metallic sleeve D which may have an annular bore to receive the annular drag-bar, or it may have a rectangular bore when it is to be applied to a rectangular drag-bar as will be understood. Said sleeve is provided with the boss or enlargement D' at one side through which extends a rectangular opening $d$. The shield C' which is of the ordinary construction and used for the ordinary purpose, $i.\ e.$ to protect the young corn plants from harm while undergoing cultivation, has its arm $d'$ pivotally connected at $d^2$ with the arm $d^3$, which latter passes upwardly through the opening $d$, of holder D. Said arm $d^3$ should be perforated to permit of the passage of the securing set screw F which passes also through a horizontal opening $d$ in the holder D and impinges upon the drag-bar, thus securing the holder and shield in position. It will be seen that the holder and shield may be readily slid along the drag-bar to any desired position and then secured by the set-screw. The shield when in place occupies a position in a vertical plane intermediate the shovel-standards, which, as shown, lie upon either side of said shield.

My attaching devices, as will be seen are extremely simple in construction and adapted for ready adjustment to suit the various requirements in cultivating, and the advantages attained over other devices of this character will be apparent.

What I claim, and desire to secure by Letters Patent, is—

1. The combination with an annular drag-bar, of the described device for attaching shovel-standards to said drag-bar, consisting of the arm A provided at one end with the sleeve A' having a tubular bore and mounted and adapted to be adjusted circumferentially and longitudinally upon the drag-bar, a threaded perforation in said sleeve, a set-screw working in said perforation, and impinging upon the drag-bar, a recess $A^2$ in the outer end of the arm and provided with a perforation $b$, a shovel-standard seated in the recess $A^2$ and a securing-bolt $b'$ passing through a perforation in the standard, and the perforation $b$, as and for the purpose specified.

2. The combination with a cultivator drag-bar and a shield C' secured to arm $d'$ and an arm $d^3$ to which said arm $d'$ is pivoted, of the sleeve D mounted and adapted to slide upon said drag-bar, the boss or enlargement D' on said sleeve, and having a vertical opening $d$, through which the arm $d^3$ passes, and the set-screw F working in a horizontal opening $d$ in said enlargement and in an opening in arm $d^3$ and impinging on the drag-bar, for securing the shield and holder in place, as described.

In testimony whereof I affix my signature in presence of two witnesses.

A. S. McDERMOTT.

Witnesses:
  ALEX. SIMPLOT,
  G. A. BARNES.